(12) United States Patent
Liu et al.

(10) Patent No.: US 7,933,350 B2
(45) Date of Patent: Apr. 26, 2011

(54) CHANNEL-DEPENDENT FREQUENCY-DOMAIN SCHEDULING IN AN ORTHOGONAL FREQUENCY DIVISION MULTIPLEXING COMMUNICATIONS SYSTEM

(75) Inventors: Yin Liu, Beijing (CN); Lei Wan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 801 days.

(21) Appl. No.: 11/928,510

(22) Filed: Oct. 30, 2007

(65) Prior Publication Data

US 2009/0110087 A1 Apr. 30, 2009

(51) Int. Cl.
*H04K 1/10* (2006.01)
*H04L 27/28* (2006.01)
(52) U.S. Cl. .................................. 375/260; 370/203
(58) Field of Classification Search .............. 375/224, 375/227, 259–260, 285, 377; 370/203, 206, 370/329, 431, 464
See application file for complete search history.

(56) References Cited

U.S. PATENT DOCUMENTS

| 7,012,912 | B2 | 3/2006 | Naguib et al. | |
|---|---|---|---|---|
| 7,586,990 | B2 * | 9/2009 | Subramanian et al. | 375/260 |
| 7,746,758 | B2 * | 6/2010 | Stolpman | 370/203 |
| 2006/0034244 | A1 | 2/2006 | Huang et al. | |
| 2007/0177501 | A1 | 8/2007 | Papasakellariou | |
| 2007/0230405 | A1 * | 10/2007 | Yin et al. | 370/335 |
| 2008/0181318 | A1 * | 7/2008 | Kim et al. | 375/260 |

FOREIGN PATENT DOCUMENTS

| EP | 1750406 A | 2/2007 |
|---|---|---|
| EP | 1906569 A | 4/2008 |
| WO | 2007020995 A | 2/2007 |

OTHER PUBLICATIONS

Myung, H. G. et al. "Single Carrier FDMA for Uplink Wireless Transmission." IEEE Vehicular Technology Magazine, Sep. 2006, pp. 30-38.
Pokhariyal, A. et al. "Performance of Downlink Frequency Domain Packet Scheduling for the UTRAN Long Term Evolution." The 17th Annual IEEE International Symposium on Personal, Indoor and Mobile Radio Communications (PIMRC '06), Sep. 2006, pp. 1-5.
Xia, P. et al. "Bandwidth- and Power-Efficient Multicarrier Multiple Access." IEEE Transactions on Communications, vol. 51, No. 11, Nov. 2003, pp. 1828-1830.

* cited by examiner

*Primary Examiner* — Jean B Corrielus
(74) *Attorney, Agent, or Firm* — Coats & Bennett, P.L.L.C.

(57) ABSTRACT

Methods and apparatus are disclosed for scheduling sub-carriers in an Orthogonal Frequency Division Multiplexing (OFDM) communication system. In an exemplary method, channel quality metric values for each of a plurality of sub-channels are determined, in view of a selected mobile terminal. For each of two or more threshold levels for the channel quality metric, sub-carrier groups composed of sub-carriers corresponding to sub-channels having channel quality metric values superior to the threshold level are identified, and an estimated data throughput is calculated for each of the identified sub-carrier groups. One or more of the identified sub-carrier groups is allocated to the selected mobile terminal according to the estimated data throughputs.

40 Claims, 8 Drawing Sheets

CHANNEL-DEPENDENT FREQUENCY-DOMAIN SCHEDULING IN AN ORTHOGONAL FREQUENCY DIVISION MULTIPLEXING COMMUNICATIONS SYSTEM

BACKGROUND

1. Technical Field

The present invention generally relates to communications systems, and particularly relates to scheduling sub-carriers in Orthogonal Frequency Division Multiplexing (OFDM) communications systems.

2. Background

The $3^{rd}$ Generation Partnership Project (3GPP) is currently developing specifications for new wireless communications systems as part of its "Long Term Evolution" (LTE) initiative. The goals of LTE include very high peak data rates (up to 100 Mbps on the downlink; up to 50 Mbps on the uplink) for mobile users. In order to achieve these goals, LTE as currently planned employs advanced multiple access schemes, adaptive modulation and coding schemes, and advanced multi-antenna technologies.

OFDM technology is a key component of the LTE initiative. Coupled with other evolving technologies, including Multiple-Input Multiple-Output (MIMO), an advanced antenna technology, the LTE initiative promises much higher data rates for mobile wireless users than are currently available, along with more efficient use of radio frequency spectrum. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified OFDMA (Orthogonal Frequency Division Multiple Access) for the downlink (transmissions from a base station to mobile terminal) and single carrier frequency division multiple access (SC-FDMA) for the uplink (transmissions from a mobile terminal to base station). Both multiple access schemes permit the available sub-carriers to be allocated among several users.

SC-FDMA technology employs specially formed OFDM signals, and is therefore often called "pre-coded OFDM" technology. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. (SC-FDMA is described more fully in Myung, et al., "Single Carrier FDMA for Uplink Wireless Transmission," IEEE Vehicular Technology Magazine, vol. 1, no. 3, September 2006, pp. 30-38.)

LTE link resources are organized into "resource blocks," defined as time-frequency blocks with a duration of 0.5 milliseconds (one slot, or half a sub-frame) and encompassing a bandwidth of 180 kHz (corresponding to 12 sub-carriers with a spacing of 15 kHz). The exact definition of a resource block may vary among LTE and similar systems, and the inventive methods and apparatus described herein are not limited to the numbers used herein. In general, resource blocks may be dynamically assigned to mobile terminals, and may be assigned independently for the uplink (reverse link) and the downlink (forward link). Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

LTE also employs multiple modulation formats (including at least QPSK, 16-QAM, and 64-QAM), as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells.

Efficient utilization of the air interfaces is a key goal of the LTE initiative. A key advantage of the proposed OFDM technologies is the flexibility with which resources may be allocated, or "scheduled", among multiple users. Theoretically, sub-carriers may be allocated by a base station (or "Node B") to mobile terminals on an individual basis or in groups; in practice, allocations are typically made on a resource block basis. A variety of scheduling algorithms have been proposed for solving the problem of simultaneously serving multiple users in LTE systems. In general terms, scheduling algorithms are used as an alternative to first-come-first-served queuing and transmission of data packets. As is well known to those skilled in the art, simple scheduling algorithms include round-robin, fair queuing, and proportionally fair scheduling. If differentiated or guaranteed quality of service is offered, as opposed to best-effort communication, weighted fair queuing may be utilized.

Channel-dependent scheduling may be used to take advantage of favorable channel conditions to increase throughput and system spectral efficiency. For example, in an OFDM system, channel quality indicator (CQI) reports, which typically indicate the signal-to-noise ratio (SNR) or signal-to-noise-plus-interference ratio (SINR) measured or estimated for a given channel, may be used in channel-dependent resource allocation schemes. The simplest scheme, conceptually, is to select a mobile terminal having a highest priority, whether based on fairness, quality-of-service guarantees, or other decision metric, and to allocate some number of sub-channels with the highest measured or estimated SINRs to the selected mobile terminal. This approach exploits the frequency diversity inherent to a multi-user OFDM system. Since different mobile terminals observe different frequency-dependent fading profiles, channel-dependent scheduling tends to allocate portions of the overall available bandwidth in a more efficient manner than arbitrary allocation of bandwidth chunks.

As was discussed above, sub-carriers or resource blocks may be allocated on an individual basis. However, CQI- or SINR-based allocation of individual sub-carriers or resource blocks will often lead to distributed allocations of resources, e.g., allocation of two or more widely separated resource blocks to a single mobile terminal. This may be undesirable for a number of reasons. First, generating the transmitted signal may be complicated, particularly in the case of mobile SC-FDMA transmitters, by distributed allocation of sub-carriers. Second, dynamically scheduled allocations must typically be reported by the base station to the mobile terminal. Reporting allocations of several arbitrarily spaced resource blocks to each of several mobile terminals can consume valuable link resources that are better used for other purposes.

SUMMARY

Methods and apparatus are disclosed for scheduling sub-carriers in an Orthogonal Frequency Division Multiplexing (OFDM) communication system. In an exemplary method, channel quality metric values for each of a plurality of sub-channels are determined, in view of a selected mobile terminal. For each of two or more threshold levels for the channel quality metric, sub-carrier groups composed of sub-carriers corresponding to sub-channels having channel quality metric values superior to the threshold level are identified, and an estimated data throughput is calculated for each of the identified sub-carrier groups. One or more of the identified sub-carrier groups is allocated to the selected mobile terminal according to the estimated data throughputs.

In another exemplary method, two or more threshold interference levels for a channel quality metric are determined. For each of the threshold interference levels, sub-carrier groups having interference levels below the threshold interference level are identified, and an estimated data throughput is calculated for each of the identified sub-carrier groups, in view of a selected mobile terminal. One or more of the identified sub-carrier groups is allocated to the selected mobile terminal according to the estimated data throughputs.

In yet another exemplary method, two or more threshold levels for a channel measurement parameter are selected. For each of the threshold levels, sub-carrier groups corresponding to sub-channels having channel measurement parameters superior to the threshold level are identified, and an estimated data throughput is calculated for each of the identified sub-carrier groups, in view of a selected mobile terminal. At least one of the identified sub-carrier groups is allocated to the selected mobile terminal according to the estimated data throughputs.

Various embodiments of the above methods further comprise generating a signaling message for the selected mobile terminal, the signaling message comprising a first parameter identifying a sub-carrier in a first one of the at least one allocated sub-carrier group and a second parameter indicating the number of sub-carriers in the first one of the at least one allocated sub-carrier group.

In one or more embodiments, the sub-carriers are organized into resource blocks comprising two or more contiguous sub-carriers, so that identifying one or more sub-carrier groups comprises identifying one or more sub-carrier groups composed of contiguous resource blocks, wherein each of the contiguous resource blocks is composed of sub-carriers corresponding to sub-channels having the appropriate characteristics. In one or more of these embodiments, a signaling message is generated, wherein the signaling message comprises a first parameter identifying a resource block in a first one of the at least one allocated sub-carrier group and a second parameter indicating the number of resource blocks in the at least one allocated sub-carrier group.

In various embodiments, an identified sub-carrier group having the highest estimated data throughput is allocated to the selected mobile terminal. In some embodiments, two or more of the identified sub-carrier groups having an aggregate estimated data throughput equal to or exceeding a data throughput target for the selected mobile terminal are selected and allocated to the selected mobile terminal.

Various scheduling subsystems for scheduling sub-carriers in an OFDM communication system are also disclosed.

DETAILED DESCRIPTION

Presented herein are inventive methods and apparatus for scheduling sub-carriers in Orthogonal Frequency Division Multiplexing (OFDM) communication systems. Although the following description illustrates the inventive techniques as applied to an LTE system employing both OFDMA and SC-FDMA technologies, these techniques may also be applied to other wireless communications systems where bandwidth is dynamically allocable to mobile or fixed transmitters. For instance, although the inventive methods and apparatus are presented below in the context of a mobile terminal communicating with a fixed base station, these techniques may also be applied to mobile-to-mobile links, such as in an ad-hoc network or relay scenario.

Channel-Dependent Interference-Based Scheduling in an OFDM Communication System

Figure 1:
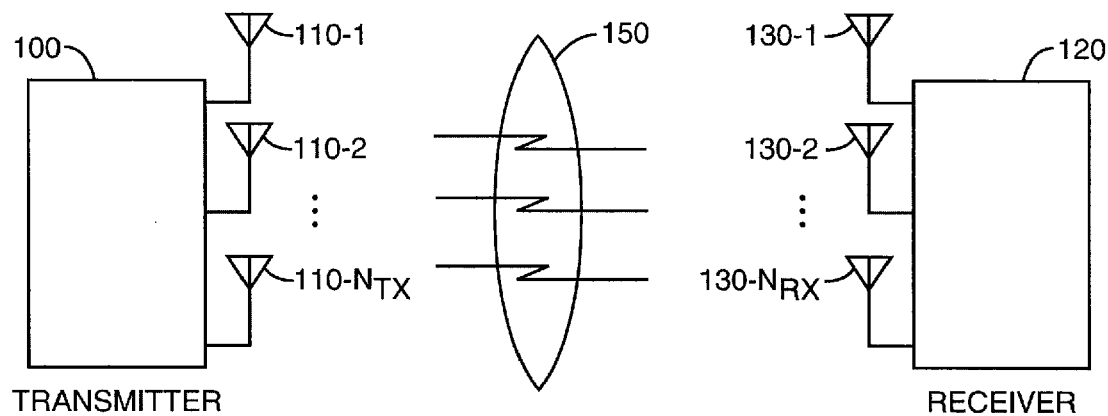
FIG. 1 is a block diagram of an exemplary wireless communications link.

FIG. 1 illustrates a wireless digital communications link employing OFDM as well as multiple-input, multiple-output (MIMO) technology. Transmitter 100 transmits an OFDM signal using multiple antenna elements 110-1, 110-2 . . . 110-$N_{TX}$. Similarly, receiver 120 receives OFDM signals through receive antennas 130-1, 130-2 . . . 130-$N_{RX}$. Of course, FIG. 1 illustrates only one link in a wireless communications system. In general, transmitter 100 may be but a single component in a wireless communications system, such as a wireless base station, and will generally be accompanied by a wireless receiver. Likewise, receiver 120, which may be part of a mobile terminal, will generally be accompanied by a corresponding transmitter subsystem.

In any event, signals transmitted from transmitter 100 to receiver 120 pass through a propagation channel 150. Although illustrated in FIG. 1 as comprising only the path between the receive and transmit antennas, the propagation channel 150 is often treated for analytical purposes as including effects caused by analog components in the transmitter 100 and receiver 120. Regardless, a wideband radio signal will experience various transformations and distortions as it passes through the propagation channel 150. For example, the propagation channel 150 may be frequency selective, so that some frequency components of the transmitted signal are attenuated more or less than other components. In addition, a particular physical environment will often result in multi-path distortion, caused by the simultaneous reception at the receiver of signal components arriving via different paths. Various technologies and techniques, including, for example, the use of multiple antenna elements as shown in FIG. 1, are employed to combat these distortions.

Figure 2A:
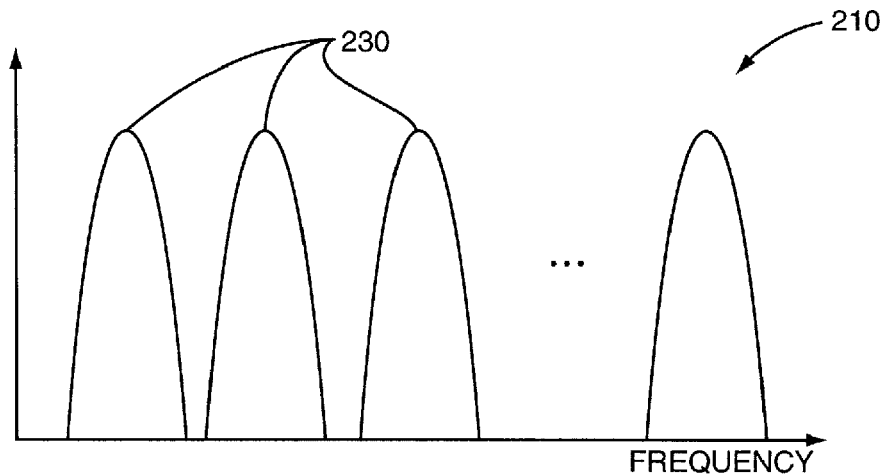
FIG. 2A is a frequency spectrum diagram for a multi-carrier signal.
Figure 2B:
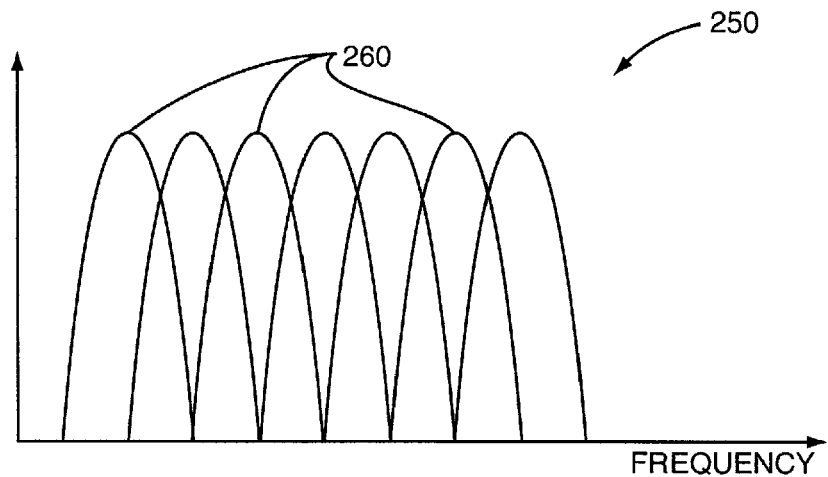
FIG. 2B is a frequency spectrum diagram for an OFDM signal.

Signals employed in wireless communications systems are typically designed to combat one or more of these problems. FIG. 2A illustrates one approach, namely, the use of a multi-carrier communications signal. The composite signal 210 comprises several sub-carriers 230. Each sub-carrier is separately modulated with data. Dividing a signal into sub-carriers 230 creates several advantages. If the bandwidth of the individual sub-carriers is small enough, each sub-carrier will experience flat fading, even if the overall radio propagation environment is frequency-selective. In addition, if the symbol modulation rate is selected so that the symbol duration exceeds the maximum delay spread caused by the propagation channel 150, then inter-symbol interference is less troublesome. FIG. 2B illustrates the construction of an OFDM signal 250. By ensuring that the individual sub-carriers 260, often called "tones", are orthogonal to each other, the spectrum of one tone 260 may overlap the next tone 260, without causing crosstalk between the tones. Orthogonality between the tones is achieved using the properties of the discrete Fourier transform (DFT); creation of OFDM signals using the inverse DFT is well known by those skilled in the art.

Figure 3:
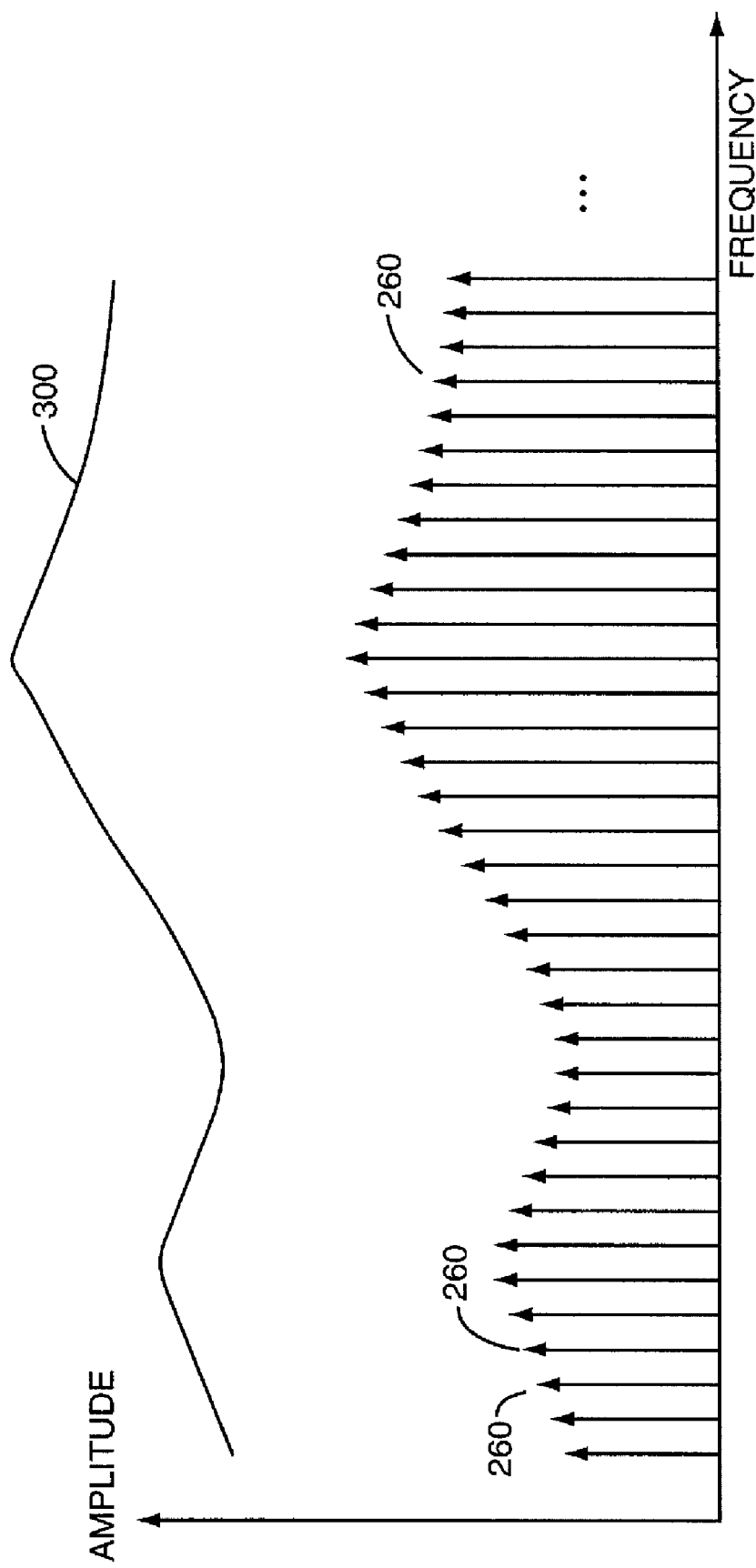
FIG. 3 illustrates a frequency-selective propagation channel response versus OFDM tones.

FIG. 3 is a simplified representation of the impact of frequency selectivity on a signal comprising many OFDM tones. As explained above, the propagation channel 150 will generally be frequency selective, particularly for a wideband signal. Thus, given a common transmit power, the amplitudes of the received OFDM tones will vary across the OFDM signal bandwidth; this variation is illustrated in FIG. 3 by frequency response curve 300. It should be noted that the variation across frequency response curve 300 is exaggerated. In a practical application, the variation in amplitude between one tone and the next will be relatively small. However, because in practice an OFDM signal may include thousands of tones, the variation across the entire OFDM signal may be quite large.

Those skilled in the art will recognize that frequency selectivity in the wideband channel response for an OFDM signal, such as is illustrated in FIG. 3, results in sub-channel gains that vary from one sub-carrier to another. In other words, given a constant transmitted power level, the received signal power for each sub-carrier will vary according to the frequency selectivity of the overall channel. The difference between the transmitted power for a given sub-carrier and the corresponding received sub-carrier power is the sub-channel gain.

Interference observed at an OFDM receiver will also vary with frequency, and thus from one sub-carrier to another. Sub-channel variation in interference will vary for several reasons. First, a wideband interfering signal, such as might be received at a mobile terminal receiver from one or more neighboring base stations, will generally encounter a frequency-selective channel response. Second, interfering signals at two different sub-carrier frequencies may emanate from different sources, and thus experience distinct propagation channel conditions. This may be true even for closely spaced sub-carriers.

For instance, inter-cell interference in the uplink is caused by transmissions from mobile terminals in neighboring cells. Uplink resources in the neighboring cells may be allocated among numerous mobile terminals, several of which may be located at different locations and different distances from the base station receiver observing the interference. As discussed above, resource blocks (or sub-carriers) may be allocated among the mobile terminals on an individual basis. As a result, interference received on various sub-channels may emanate from physically diverse sources. Furthermore, because the interfering sources are typically subject to power control, the power level of the interfering transmissions may also vary. Conversely, inter-cell interference in the downlink is caused by transmissions from base stations in neighboring cells. Those skilled in the art will appreciate that interference levels at a mobile terminal receiver will vary from one mobile terminal to another, depending on the terminals' locations relative to neighboring (interfering) base stations, the power levels assigned to each sub-carrier by the interfering base stations, and the frequency-selective channel conditions experienced by each interfering sub-carrier signal. Generally speaking, then, sub-channel interference may vary significantly from one sub-channel or resource block to the next.

The interference level is easily measured at a receiver, and may be utilized to perform interference-based frequency domain scheduling of sub-carriers in an OFDM system. Uplink interference levels may be determined in the Node B receiver directly, whether with direct measurements of each sub-channel or with a combination of measurements and estimations. For the downlink, interference levels for a given mobile terminal must be determined based on measurements reported by the mobile terminal. In either case, allocation of sub-carriers to a particular mobile terminal may advantageously take account of the variation of interference levels across frequency.

Figure 4:
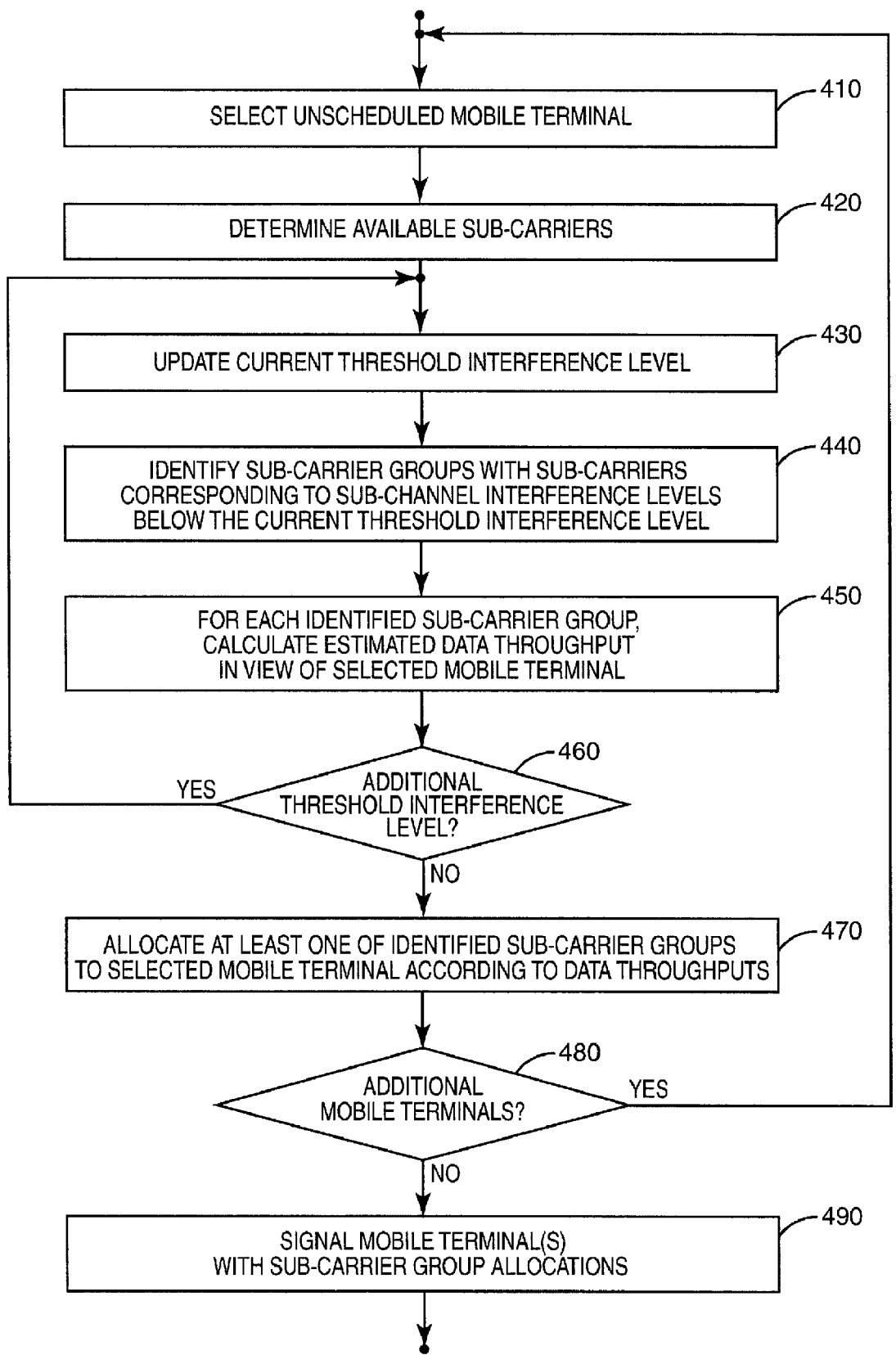
FIG. 4 is a flow diagram illustrating an exemplary method for scheduling sub-carriers in an OFDM system.

FIG. 4 illustrates a general procedure for scheduling sub-carriers in an OFDM system in view of interference levels. Although the procedure illustrated in FIG. 4 will be described with respect to the allocation of downlink resources, those skilled in the art will appreciate that a similar procedure may be applied to the allocation of uplink resources. In either case, the procedure of FIG. 4 is typically performed at a Node B serving several mobile terminals.

At block 410, a mobile terminal is selected for scheduling. The mobile terminal may be selected by a variety of means. For instance, mobile terminals waiting to be served may be ordered according to prioritization criteria, which might include quality-of-service (QoS) agreements, the quantity of data targeted to each mobile terminal and waiting to be transmitted, and so on. Fairness criteria might also be applied to ensure that all terminals are served at least occasionally.

After selecting a mobile terminal, the Node B determines the available sub-carriers for scheduling, as illustrated at block 420. If the selected mobile terminal is the first one scheduled for a given time period, then all resource blocks may be available. (Certain sub-carriers and/or resource blocks may be set aside for control channels, pilot symbols, and the like.) However, in certain cases, some resource blocks may be unavailable for a given mobile terminal, even if not already allocated to another. For example, interference coordination may require that certain resource blocks be allocated only to mobile terminals at or near the edge of the serving cell, while other resource blocks are reserved for mobile terminals closer to the center.

Figure 5:
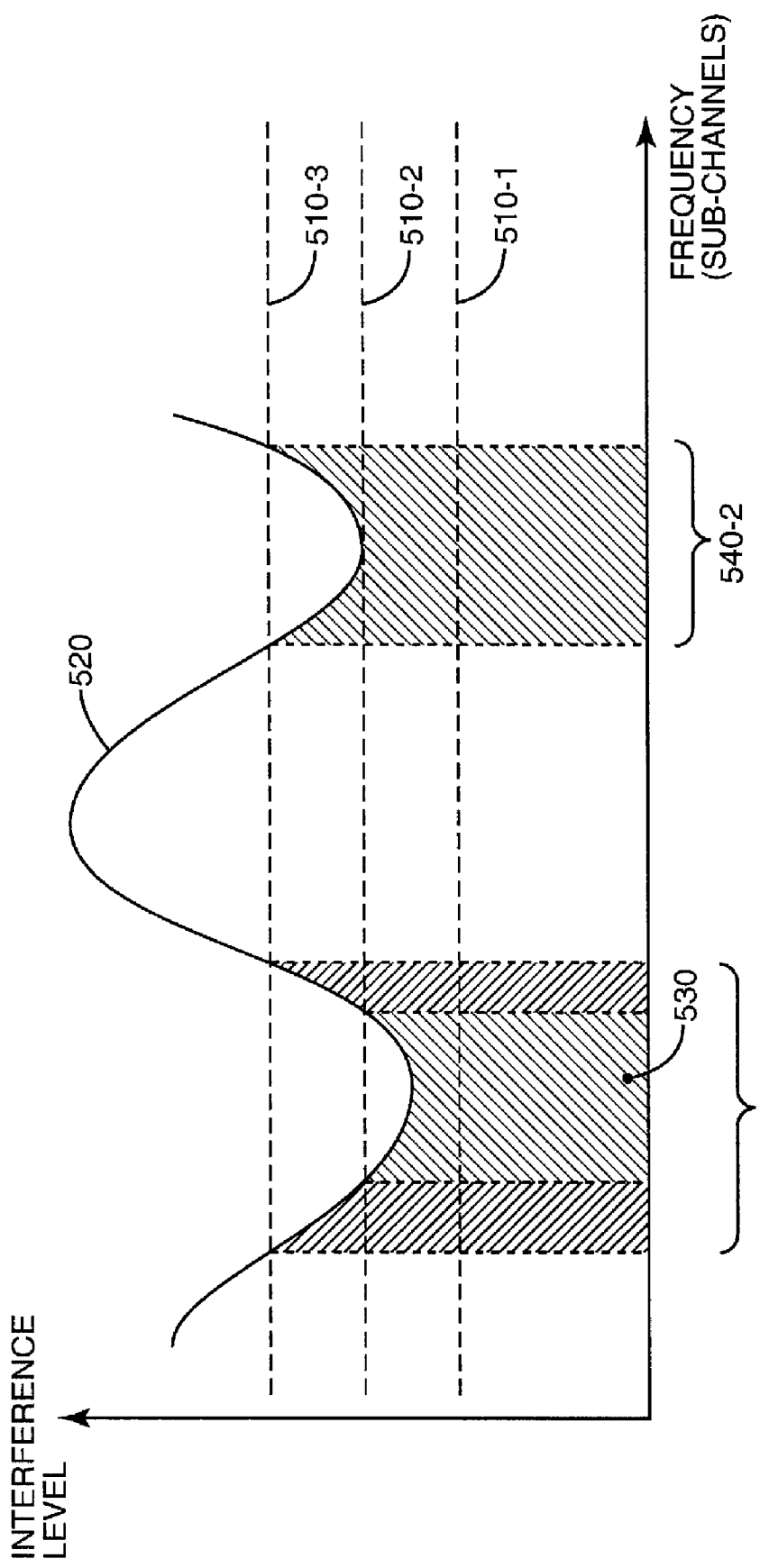
FIG. 5 illustrates the identification of sub-carrier groups using an exemplary interference profile and threshold interference levels.

In addition to updating the available sub-carriers for scheduling, the Node B selects a current threshold interference level for use in the scheduling algorithm, at bock 430. As will be further described below, two or more threshold interference levels, typically corresponding to the expected range of interference, are employed in the scheduling process. FIG. 5 illustrates several such threshold interference levels 510-1, 510-2, and 510-3, plotted with respect to an exemplary interference profile 520. For allocation of downlink sub-carriers, the interference profile 520 will correspond to measured and/or estimated sub-channel interference levels at the selected mobile terminal. The number of threshold interference levels

510, as well as their levels, may be pre-determined, or may be determined as a function of the interference profile 520. For example, the range of sub-channel interference levels for the available sub-channels may be computed, and a pre-determined number of threshold interference levels mapped to cover all or a portion of the determined range. Alternatively, a lowest threshold interference level may be set at a level slightly higher than the minimum measured sub-channel interference level, with additional threshold interference levels established at pre-determined intervals above the minimum. Similarly, a threshold interference level may be established at a mean level for the measured interference levels, with several additional threshold interference levels set above and/or below the measured mean.

Referring back to FIG. 4, at block 440, sub-carrier groups composed of sub-carriers corresponding to sub-channel interference levels below the current threshold level are identified. For a given threshold level, there may be one, several, or no such groups. This may be appreciated by referring once more to FIG. 5. For threshold level 510-1, no sub-carriers correspond to sub-channel interference levels lower than the threshold, since the entirety of the interference profile 520 is above threshold level 510-1. However, a portion of interference profile 520 falls below threshold level 510-2, and a group of sub-carriers 530 can be identified such that each sub-carrier in the group corresponds to a sub-channel having an interference level below threshold level 510-2.

Again referring to FIG. 4, at block 450, an estimated data throughput is calculated for each identified sub-carrier group. This calculation is specific to the selected mobile terminal, as data throughput depends on the SINR for each sub-channel. (SINR in turn is a function of transmit power, channel loss, interference power, and noise power, as will be appreciated by those skilled in the art.) Thus, this calculation depends on the availability of user-specific sub-channel SINR information. For allocation of downlink resources, this information must typically be obtained from measurement data fed back to the scheduling Node B from the mobile terminals; those skilled in the art will appreciate that conventional CQI reporting schemes may be utilized. For uplink allocations, on the other hand, the user-specific sub-channel SINRs may be derived from measurements made at the Node B receiver.

In some embodiments, the data throughput estimation calculation may be very detailed. For instance, given an estimated SINR for each sub-channel, an appropriate modulation format and coding scheme may be selected and a data throughput estimated for each sub-channel based on the selected modulation format and coding scheme. These sub-channel data throughputs may be aggregated to determine an estimated data throughput for the sub-carrier group. In other embodiments, the data throughput estimate may be simplified, such as by determining an average SINR for the sub-carrier group and calculating a group throughput based on the average SINR, an appropriate modulation format and coding scheme, and the number of sub-carriers in the group.

At block 460, if one or more threshold interference levels remain unanalyzed then the Node B updates the current threshold interference level at 430, i.e., selecting a new threshold interference level 510, and repeats the sub-carrier group identification of block 440, using the new threshold interference level 510. Depending on the order in which threshold interference levels are selected, sub-carrier groups identified at this stage may overlap previously identified sub-carrier groups. For instance, given the interference profile 520 of FIG. 5 and threshold level 510-3, two sub-carrier groups 540-1 and 540-2 are identified, each composed of sub-carriers corresponding to sub-channel interference levels below threshold interference level 510-3. Sub-carrier group 540-1 overlaps previously identified sub-carrier group 530, but includes additional sub-carriers not included in sub-carrier group 530. Sub-carrier group 540-2, on the other hand, is new; none of the corresponding sub-channels have interference levels falling below the earlier-tested threshold interference levels.

Estimated data throughputs are calculated for each of these newly identified sub-carrier groups, just as was done for earlier sub-carrier groups, at block 450. Those skilled in the art will recognize that if a particular sub-carrier group completely overlaps another and includes additional sub-carriers, then it will necessarily have a higher throughput, given that the modulation format, coding scheme, and power level can be optimized separately for each sub-channel. However, if a common power level, modulation format, or coding scheme must be used for several or all of the sub-carriers in a group, then different results may prevail.

Once each threshold interference level has been analyzed, one or more of the identified sub-carrier groups are allocated to the selected mobile terminal at block 470. This allocation is based on the estimated data throughputs calculated at block 450. In some embodiments, a single sub-carrier group having the highest estimated data throughput is allocated to the mobile terminal. In other embodiments, two or more of the identified sub-carrier groups may be selected, so that their aggregate estimated data throughput meets or exceeds a data throughput target for the selected mobile terminal. Of course, if two or more sub-carrier groups are allocated, they must be non-overlapping to achieve the expected data throughput. The data throughput target may be determined, for example, as a function of a QoS guarantee, e.g. a "promise" that a certain bit-rate will be delivered. Alternatively, the data throughput target might be a function of the quantity of data targeted to the selected mobile terminal and currently waiting to be delivered, i.e., the quantity of data queued at the Node B for the selected mobile terminal.

If one or more additional mobile terminals remains to be scheduled, as determined at block 480 of FIG. 4, then the above-described procedure is repeated. Another mobile terminal is selected at block 410, and the availability of sub-carriers is updated at block 420, based on the allocation of sub-carrier groups to the previously scheduled mobile terminal. Once the available sub-carriers are determined, then identification of sub-carrier groups, estimation of data throughputs, and allocation of sub-carrier groups proceeds in the same manner as for the previously scheduled mobile terminal. Because the propagation channel characteristics vary from terminal to terminal, the optimal sub-carrier group or groups for the second scheduled mobile terminals are likely to be quite different. This is true even for uplink scheduling, where the interference profile might be the same for each mobile terminal, since the sub-channel gains, and thus the sub-channel SINRs, will generally vary a great deal from one mobile terminal to the next. Thus, the above-described scheduling algorithm makes effective use of the frequency diversity inherent in a multi-user OFDMA scheme, while also allowing for QoS-based user prioritization and interference coordination.

In any event, after the sub-carrier groups are allocated, the mobile terminals must be notified of the allocations. This is illustrated in FIG. 4 at block 490. Because sub-carriers or resource blocks are allocated in groups, signaling may be greatly simplified, as it is not necessary to identify each resource block to the scheduled mobile terminal. Rather, a mobile terminal may be notified of its allocation using a message comprising a mobile terminal identifier, an identification of a "starting" resource block, and a group length. This significantly reduces the number of bits required for signaling allocations. For instance, assume that there are $N_{RB}=300$ resource blocks available per frame, and $N_{UE}=10$ users to be served in a cell. Suppose finally that n=4 users are actually scheduled. In a system where resource blocks may be allocated arbitrarily, $N_{RB}*\log_2(N_{UE})=996$ bits/frame must be used to signal the allocation, while the simplified approach facilitated by allocation of a single sub-carrier group to each mobile terminal requires only $n*(N_{UE}+\log_2(N_{RB})+\log_2(N_{RB}))=79$ bits/frame. This example can be easily extended to show that group-based allocation facilitates more efficient signaling than arbitrary resource block-based allocation, even if several groups may be allocated to each mobile terminal.

As the previous example illustrates, fewer mobile terminals than all mobile terminals waiting to be served might be scheduled for a given frame. In this case, the scheduled mobile terminals might be de-prioritized for the scheduling of the next frame, thus ensuring fairness in scheduling. However, under other circumstances all waiting mobile terminals may be scheduled for a given frame according to the previously described approaches, with unallocated sub-carriers or resource blocks left over. In this case, the procedure described above and illustrated in FIG. 4 may be repeated until all resource blocks have been allocated. In some systems, mobile transmitters may be restricted to using contiguous sub-carriers, in which case allocation of non-contiguous groups may not be permitted. In such a system, it may be advantageous to use the above-described procedures to generate an initial allocation of sub-carrier groups, and to modify the sub-carrier groups allocated to the mobile terminals by extending one or more of the groups to capture un-allocated sub-carriers. Those skilled in the art will appreciate the advantages and disadvantages of these variations, and will recognize that additional variations of these methods, falling within the scope of the claims, are also possible.

Those skilled in the art will also appreciate that these methods may be adapted for allocation of either uplink or downlink resources, the primary difference being the source of interference and SINR information. Furthermore, the methods are applicable to OFDMA, as planned for the LTE downlink, as well as to SC-FDMA, as planned for the LTE uplink. Of course, although these methods are described herein in reference to the planned 3GPP LTE wireless communications system, the methods are also applicable to other OFDM-based systems.

Channel-Dependent Frequency Domain Scheduling for an SC-FDMA Uplink

In the methods described above, sub-carriers were grouped according to corresponding sub-channel interference levels. For the uplink, interference levels will generally be user-independent, as inter-cell interference arises from mobile terminals in neighboring cells. As a result, the initial identification of sub-carrier groups based on uplink interference levels will generally be the same, regardless of which mobile terminal is selected. (This might not be the case, for example, if beam-forming using multiple antennas is accounted for in determining the interference levels.) If the interference-based approach is used for allocation of downlink resources, on the other hand, the relevant interference levels are determined at the mobile terminal, and will naturally vary from one terminal to the next. As a result, the grouping of sub-carriers according to interference levels and a threshold interference level will differ, depending on which mobile terminal is selected.

Another approach might be used instead, in which sub-carriers are grouped according to a user-specific channel quality metric such as SINR or other CQI. The SINR of a given sub-channel depends on inter-cell interference, of course, but also depends on the sub-channel gain, i.e. the frequency-dependent path loss between the mobile terminal and the base station. SINR and related CQIs are thus inherently terminal-specific channel parameters. Accordingly, an SINR-based approach may be advantageously used in channel-dependent allocation of both uplink and downlink resources.

As currently defined by 3GPP, the uplink of an LTE system employs single carrier frequency division multiple access (SC-FDMA) technology. SC-FDMA is similar to the conventional OFDMA technology described above, but has several characteristics that make it more suitable for a mobile transmitter. In particular, a typical SC-FDMA signal exhibits a lower Peak-to-Average-Power Ratio (PAPR) than seen with OFDMA. This allows the power amplifier to be operated more efficiently, saving valuable battery resources.

Figure 6:
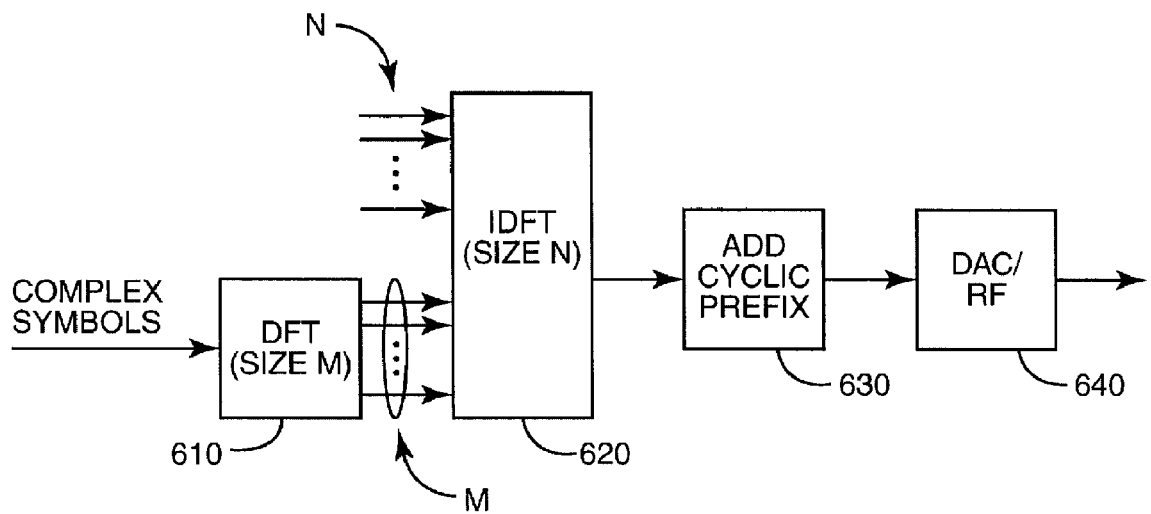
FIG. 6 is a block diagram illustrating the generation of an SC-FDMA signal.

FIG. 6 depicts the basic functional blocks in a SC-FDMA transmitter. Those skilled in the art will immediately recognize the similarity to a conventional OFDM transmitter. Complex symbols according to one or more of several modulation schemes, including BPSK, QPSK, 8-PSK, and 16-QAM, are processed at block 610 using a size-M discrete Fourier transform (DFT). (In LTE systems, QPSK and 16-QAM modulations are supported. However, higher-order modulation formats, e.g. M-PSK and M-QAM, may also be used in SC-FDMA systems.) Each group of M symbols is transformed by block 620 to produce a frequency-domain representation of the symbols. Each of the M DFT outputs are mapped to one of the N orthogonal sub-carriers to be transmitted. (N is typically much larger than M.) As with OFDMA, an N-point inverse DFT (IDFT) is performed, at block 620, to transform the sub-carrier amplitudes to a time-domain sequence. After inserting a cyclic prefix, at block 630, to reduce inter-symbol interference from multi-path distortion, the resulting time-domain sequence is converted to an analog signal and used to modulate a single radio frequency carrier using the digital-analog-converter (DAC) circuitry and RF circuitry pictured at block 640.

SC-FDMA is sometimes referred to as pre-coded OFDM, as the generation of the transmitted signal resembles conventional OFDM modulation. The primary difference is the application of an M-size DFT (block 610) before an N-size IDFT is applied (block 620); with conventional OFDM the complex symbols are mapped directly to the N orthogonal sub-carriers. Since N>M, the DFT and IDFT do not cancel each other. Instead, the complex frequency-domain symbols are mapped to a subset of the N available sub-carriers.

Figure 7:
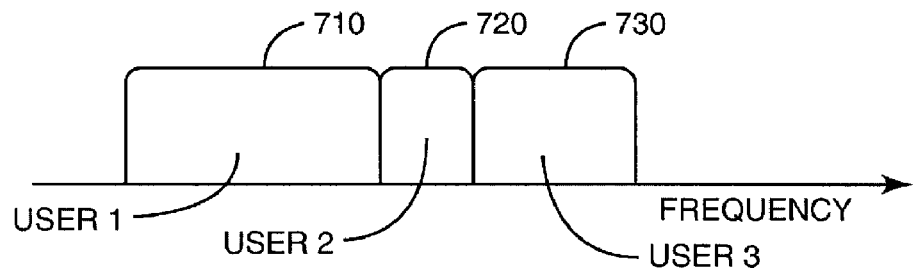
FIG. 7 illustrates allocation of bandwidth to multiple users in an SC-FDMA system.

One benefit of this approach is that the uplink signal may be easily positioned at an arbitrary position within the overall transmission bandwidth of $N \times \Delta f$, where $\Delta f$ is the sub-carrier spacing, occupying $M \times \Delta f$ of that transmission bandwidth. (In LTE, the normal sub-carrier spacing is 15 kHz.) Another benefit is that the amount of bandwidth allocated to a particular user is flexible, and can be adjusted dynamically. (Note that these benefits apply to both SC-FDMA and OFDMA signals.) For example, FIG. 7 illustrates frequency allocation between 3 users; frequency allocation 710, assigned to user 1, is considerably larger than allocation 720 or allocation 730, assigned to user 2 and user 3, respectively. As with OFDMA, just as bandwidth may be dynamically allocated to a user's mobile terminal, modulation formats and coding schemes may also be adjusted dynamically, in response to changing signal propagation conditions. In addition, the mobile terminal's transmit power level is adjusted to ensure acceptable received signal strength at the base station, given the channel conditions and the selected modulation format and coding schemes, while minimizing inter-cell interference.

As was described above, FIG. 3 is a simplified representation of the impact of frequency selectivity on a signal comprising many OFDM tones. As explained above, the propagation channel 150 will generally be frequency selective, particularly for a wideband signal. The same applies, of course to and SC-FDMA signal. Thus, the amplitude of an SC-FDMA signal will vary across the SC-FDMA signal bandwidth, and frequency selectivity in the wideband channel response for an SC-FDMA therefore results in sub-channel gains that vary from one sub-carrier/sub-channel to another.

Interference observed at an OFDM receiver will also vary with frequency, and thus from one sub-carrier/sub-channel to another. As was explained above, sub-channel variation in interference will vary for several reasons. First, a wideband interfering signal, such as might be received at a mobile terminal receiver from one or more neighboring base stations, will generally encounter a frequency-selective channel response. Second, interfering signals on two different sub-carriers may emanate from different sources, and thus experience distinct channel conditions.

Since sub-channel gains as well as sub-channel interference levels may vary from one sub-channel to another, any channel quality metric that incorporates either or both of these will also vary from one sub-channel to another. In a typical system, one or more channel quality metrics are typically estimated for each sub-channel. For the uplink, this may be accomplished using signal measurements taken at the Node B receiver. In particular, these measurements may be made using sounding reference signals, i.e., known signals transmitted on the uplink. These sounding reference signals may be specially constructed to facilitate estimation of the channel quality metrics. These channel quality metrics may then be used in the sub-carrier allocation process illustrated in FIG. 8.

At block 810, a mobile terminal is selected for scheduling. Again, the mobile terminal to be scheduled may be selected by a variety of mean, such as according to prioritization criteria, which might include quality-of-service (QoS) agreements, the quantity of data targeted to each mobile terminal and waiting to be transmitted, and so on. Fairness criteria might be applied to ensure that all terminals are served at least occasionally. After selecting a mobile terminal, the Node B determines the available sub-carriers for scheduling, as illustrated at block 820. If the selected mobile terminal is the first one scheduled for a given time period, then all resource blocks allocated to data traffic may be available.

The Node B next determines a channel quality metric value corresponding to each of the available sub-carriers, in view of the channel conditions pertaining to the selected mobile terminal. This is illustrated at block 830 of FIG. 8. As discussed, the channel quality metric values may comprise SINR values or other CQI values, and may be determined from receiver measurements and/or channel reporting.

Figure 9:
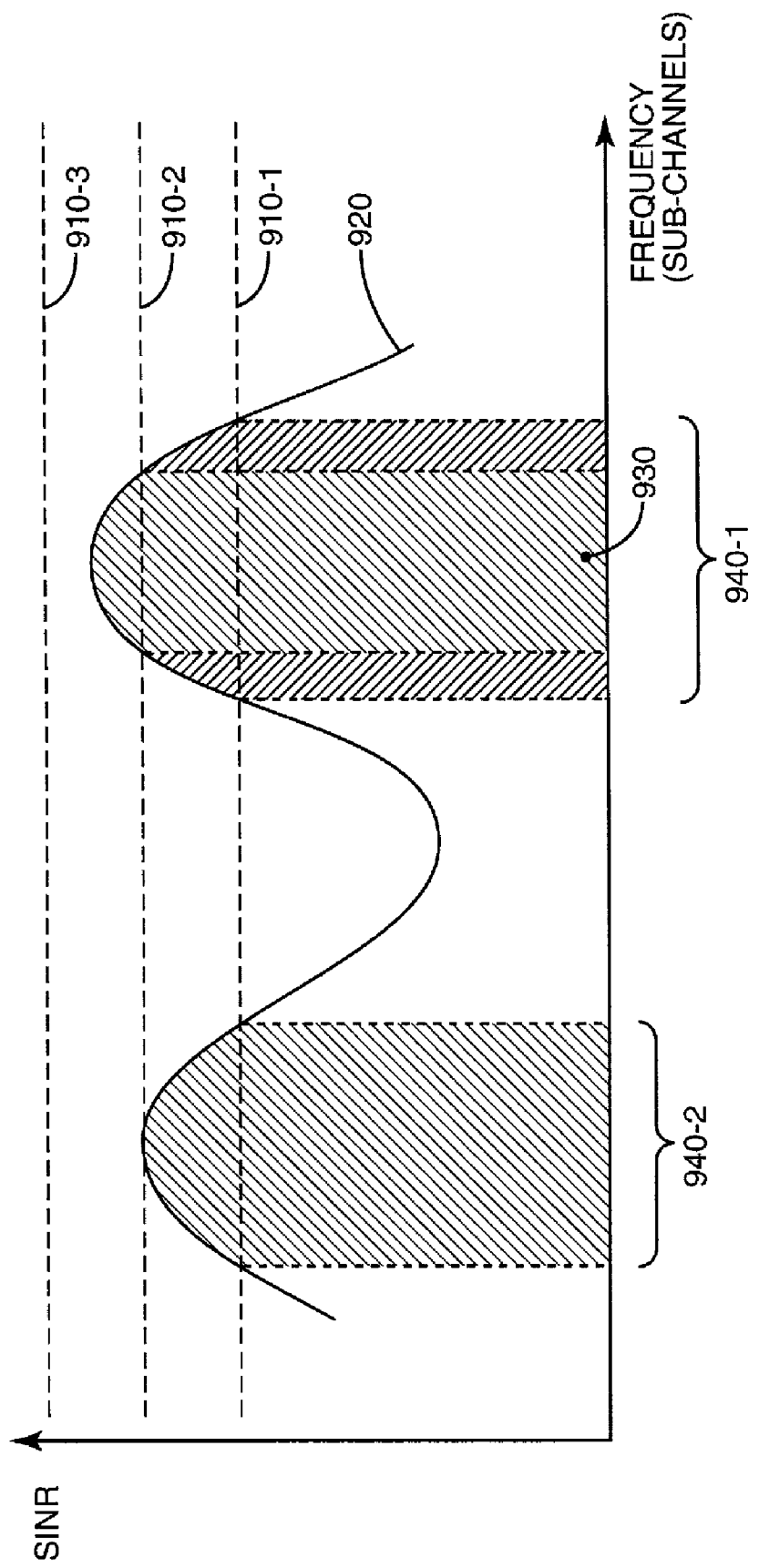
FIG. 9 illustrates the identification of sub-carrier groups using an exemplary SINR profile and threshold SINR levels.

The Node B then selects a first threshold level for the channel quality metric at bock 840. Two or more threshold levels, generally corresponding to the anticipated range of the sub-channel quality metric values, are employed in the scheduling process. FIG. 9 illustrates several such threshold levels 910-1, 910-2, and 910-3, plotted with respect to an exemplary sub-channel quality metric profile 920, in this case a profile of sub-channel SINRs. The sub-channel quality metric profile 920 simply represents the measured and/or estimated SINR values corresponding to each sub-channel/sub-carrier, plotted against frequency. As with the threshold interference levels discussed above, the number of threshold levels 910, as well as their levels, may be pre-determined, or may be determined as a function of the sub-channel quality metric profile 920. For instance, the range of sub-channel quality metric values for the available sub-channels may be computed, and a pre-determined number of threshold levels mapped to cover all or a portion of the determined range. Alternatively, threshold levels may be set to correspond to the highest and lowest measured sub-channel quality metric values, with additional threshold levels established at intervals between. Similarly, a threshold level may be established at a mean level for the measured sub-channel quality metric values, with several additional threshold levels set above and/or below the measured mean.

Referring back to FIG. 8, at block 850, sub-carrier groups composed of sub-carriers corresponding to sub-channel quality metric values superior to the current threshold level are identified. "Superior to" generally means "preferred to." If the channel quality metric is SINR, for instance, then a higher SINR is preferred to and thus superior to a lower SINR. Accordingly, a sub-channel SINR value is superior to the threshold level if it exceeds it. Other channel quality metrics may be inverted, such that a lower value is superior. In any case, for a given threshold level, there may be one, several, or no such sub-carrier groups corresponding to sub-channels having channel quality metric values superior to the threshold level. This may be appreciated by referring once more to FIG. 9. For threshold level 910-1, no sub-carriers correspond to SINR values higher than the threshold, since the entirety of the SINR profile 920 is below threshold level 910-1. However, interference profile 920 extends above threshold level 920-2, and a group of sub-carriers 930 can be identified such that each sub-carrier in the group corresponds to a sub-channel having an SINR value above threshold level 910-2.

Again referring to FIG. 8, at block 860, an estimated data throughput is calculated for each identified sub-carrier group, using a SINR or related value for each sub-channel. As before, in some embodiments, the data throughput estimation calculation may be very detailed, involving the use of sub-channel SINR values to select an appropriate modulation format and coding scheme. In effect, the expected results of link adaptation, given a selected group of sub-carriers, are pre-computed, to obtain an estimated data throughput for the sub-carrier group. In other embodiments, the data throughput estimate may be simplified, such as by determining an average SINR for the sub-carrier group and calculating a group throughput based on the average SINR, an appropriate modulation format and coding scheme, and the number of sub-carriers in the group.

At block 870, if one or more threshold levels remains unanalyzed then the Node B updates the current threshold level at 840, i.e., selecting a new threshold level 910, and repeats the sub-carrier group identification of block 850, using the new threshold level 910. As was noted earlier, sub-carrier groups identified at this stage may overlap previously identified sub-carrier groups. For instance, given the interference profile 920 of FIG. 9 and threshold level 910-3, two sub-carrier groups 940-1 and 940-2 can be identified, each composed of sub-carriers corresponding to SINRs above threshold level 910-3. Sub-carrier group 940-1 overlaps previously identified sub-carrier group 930, but includes additional sub-carriers not included in sub-carrier group 940. Sub-carrier group 940-2, on the other hand, is new; none of the corresponding sub-channels have SINRs above the earlier-tested threshold levels.

Estimated data throughputs are calculated for each of these newly identified sub-carrier groups, just as was done for earlier sub-carrier groups, at block 850. Once each threshold level has been analyzed, one or more of the identified sub-carrier groups are allocated to the selected mobile terminal at block 880. This allocation is based on the estimated data throughputs calculated at block 860. In some embodiments, a single sub-carrier group having the highest estimated data throughput is allocated to the mobile terminal. In other embodiments, two or more of the identified sub-carrier groups may be selected, so that their aggregate estimated data throughput meets or exceeds a data throughput target for the selected mobile terminal. Of course, if two or more sub-carrier groups are allocated, they must be non-overlapping to achieve the expected data throughput. The data throughput target may be determined, for example, as a function of a QoS guarantee, e.g. a "promise" that a certain bit-rate will be delivered. Alternatively, the data throughput target might be a function of the quantity of data targeted to the selected mobile terminal and currently waiting to be delivered, i.e., the quantity of data queued at the Node B for the selected mobile terminal.

Figure 8:
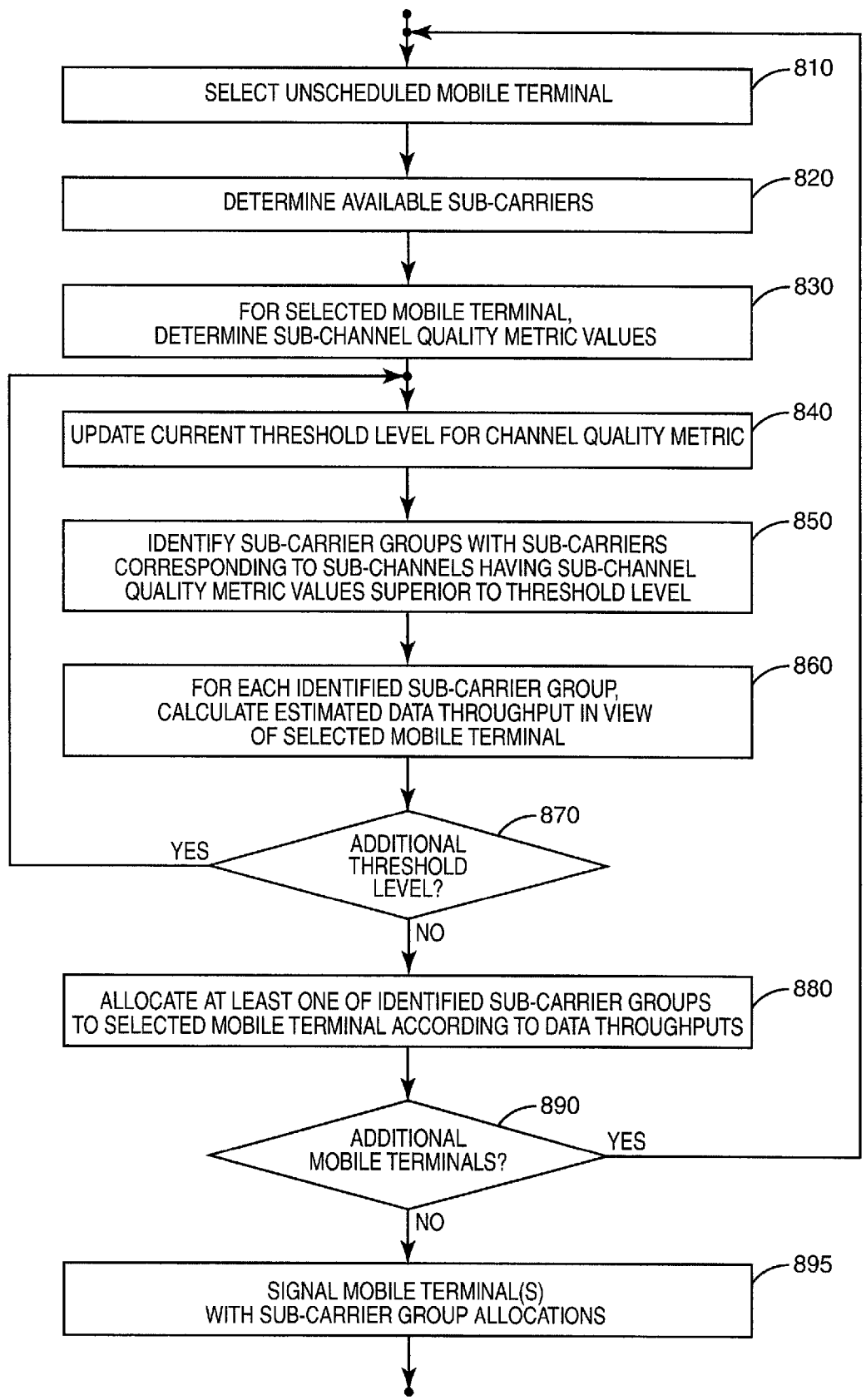
FIG. 8 is a flow diagram illustrating an exemplary method for scheduling sub-carriers in an OFDM system.

If one or more additional mobile terminals remains to be scheduled, as determined at block 890 of FIG. 8, the above-described procedure is repeated. Another mobile terminal is selected at block 810, and the availability of sub-carriers is updated at block 820, based on the allocation of sub-carrier groups to the previously scheduled mobile terminal. Once the available sub-carriers are determined, then identification of sub-carrier groups, estimation of data throughputs, and allocation of sub-carrier groups proceeds in the same manner as for the previously scheduled mobile terminal.

Once all of the mobile terminals have been scheduled or all of the available sub-carriers have been allocated, then the mobile terminals must be notified of the allocations. This is shown in FIG. 9 at block 895. As was demonstrated above, because sub-carriers or resource blocks are allocated in groups, signaling may be greatly simplified, as it is unnecessary to identify each resource block to the scheduled mobile terminal. Rather, a mobile terminal may be notified of its allocation using a message comprising a mobile terminal identifier, an identification of a "starting" resource block, and a group length, thus significantly reducing the number of bits required for signaling allocations.

Of course, fewer mobile terminals than all mobile terminals waiting to be served might be scheduled for a given frame. In this case, the mobile terminals allocated resources in one frame might be de-prioritized for the scheduling of the next frame, thus ensuring fairness in scheduling. However, under other circumstances all waiting mobile terminals may be scheduled for a given frame according to the previously described approaches, with unallocated sub-carriers or resource blocks left over. In this case, the procedure described above and illustrated in FIG. 8 may be repeated until all resource blocks have been allocated. In some systems, especially those utilizing SC-FDMA, mobile transmitters may be restricted to using contiguous sub-carriers, in which case simultaneous allocation of non-contiguous groups to a single mobile terminal may not be permitted. In such a system, it may be advantageous to use the above-described procedures to generate an initial allocation of sub-carrier groups, and to modify the sub-carrier groups allocated to the mobile terminals by extending one or more of the groups to capture unallocated sub-carriers. Those skilled in the art will appreciate the advantages and disadvantages of these variations, and will recognize that additional variations of these methods, falling within the scope of the claims, are also possible.

Those skilled in the art will also appreciate that these methods may be adapted for allocation of either uplink or downlink resources, the primary difference being the source of interference and SINR information. Furthermore, the methods are applicable to OFDMA, as planned for the LTE downlink, as well as to SC-FDMA, as planned for the LTE uplink. As with the interference-based scheduling methods described herein, although these methods are described in reference to the planned 3GPP LTE wireless communications system, the methods are also applicable to other OFDM-based systems.

Scheduler Subsystem

Figure 10:
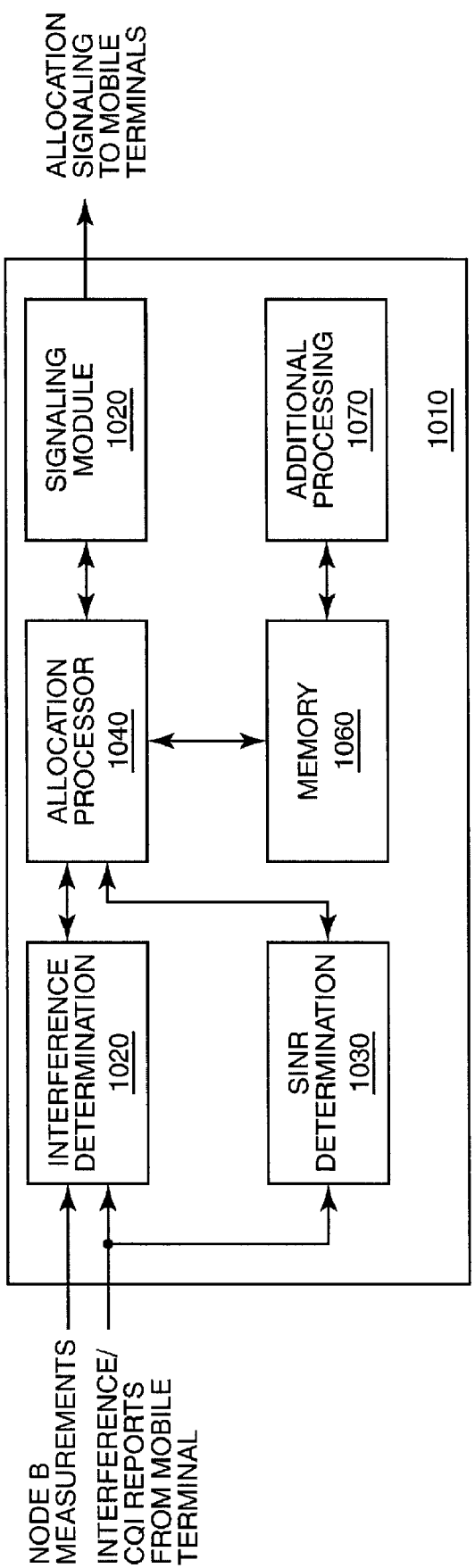
FIG. 10 is a block diagram illustrating functional components of an exemplary scheduling subsystem for scheduling sub-carriers in an OFDM communication system.

One or more of the methods described above may be performed using the exemplary scheduling subsystem 1010 pictured in FIG. 10. Scheduler subsystem 1010 may be implemented at a Node B of an OFDM wireless communications system, and comprises an interference determination module 1020; a SINR determination module 1030; an allocation processor 1040; and a signaling module 1050. Scheduler subsystem further comprises memory 1060 and additional processing at block 1070.

Interference determination module 1020 determines sub-channel interference levels for use in interference-based sub-carrier allocation as described above. If used for downlink sub-carrier allocation, interference determination module 1020 utilizes interference measurement data reported by mobile terminals. If used for uplink sub-carrier allocation, interference determination module 1020 utilizes interference measurements taken by the Node B receiver (not shown) instead of or in addition to mobile-originated data.

Similarly, SINR determination module 1030 determines sub-channel SINR values for each mobile terminal to be served. As with the interference determination module 1020, downlink SINR determination depends on mobile-originated reports at least partly characterizing the sub-channel conditions. If the channel reports are specific enough, the sub-channel SINR values may be determined directly from the channel reports. In some cases, however, SINR values for one or more sub-channels may be estimated or interpolated, based on the channel report data. SINR values for uplink sub-carrier allocation may be determined based on Node B receiver measurement data.

Interference determination module 1020 and SINR determination module 1030 are controlled by allocation processor 1040, which selects the mobile terminals to be scheduled according to one or more priority schemes and uses the interference and/or SINR data obtained by modules 1020 and 1030 in allocating sub-carriers to those mobile terminals. As discussed above, the priority scheme may incorporate QoS guarantees as well as fairness criteria, but may also be designed to optimize system throughput. In an exemplary system configuration, allocation processor 1040 is configured to perform interference-based sub-carrier allocation on an OFDMA downlink, and SINR-based sub-carrier allocation on an SC-FDMA uplink, although other system configurations are possible and may be preferred under some circumstances.

For interference-based sub-carrier allocation, allocation processor 1040 is configured to determine two or more threshold levels and to identify one or more sub-carrier groups composed of contiguous sub-carriers corresponding to sub-channels having interference levels below the respective threshold levels. For each identified sub-carrier group, allocation processor 1040 calculates an estimated data throughput. Allocation processor 1040 then allocates one or more of the identified sub-carrier groups to the selected mobile terminal, based on the estimated throughputs. Data identifying the allocated sub-carriers is provided to signaling module 1050, which notifies the selected mobile terminal of the allocation, using a control channel according to conventional methods.

For sub-carrier allocation based on terminal-specific sub-channel quality metric values, such as SINR-based allocation for an SC-FDMA uplink, allocation processor 1040 is configured to determine two or more threshold levels and to identify one or more sub-carrier groups composed of contiguous sub-carriers corresponding to sub-channels having channel quality metric values, e.g., SINR values, superior to the respective threshold levels. For each identified sub-carrier group, allocation processor 1040 calculates an estimated data throughput. Allocation processor 1040 then allocates one or more of the identified sub-carrier groups to the selected mobile terminal, based on the estimated throughputs. Again, data identifying the allocated sub-carriers is provided to signaling module 1050, which notifies the selected mobile terminal of the allocation, using a control channel according to conventional methods.

Allocation processor 1040 may be configured to allocate sub-carriers on a resource block basis, where each resource block comprises several contiguous sub-carriers. Although two or more sub-carrier groups may generally be allocated to a single mobile terminal, in certain embodiments allocation processor 1040 is configured to allocate only a single sub-carrier group to any given mobile terminal. In these embodiments, allocation processor 1040 is typically configured to allocate a sub-carrier group having the highest estimated data throughput. In some embodiments, on the other hand, allocation processor 1040 is configured to allocate several sub-carrier groups in order to meet a data throughput target. In these embodiments, allocation processor 1040 may be configured to select a sub-carrier group having the highest estimated data throughput as well as one or more additional sub-carrier groups, so that the aggregate estimated data throughput equals or exceeds the target data throughput.

After allocating sub-carrier groups to a first selected mobile terminal, allocation processor 1040 schedules additional mobile terminals according to one or more of the methods described herein. Data indicating available sub-carriers is stored in memory 1060, and is updated as allocations are made.

As will be readily understood by those skilled in the art, scheduling subsystem 1010 and its various functional blocks may be implemented using one or more microcontrollers, microprocessors, or other digital hardware, and may be implemented together or separately, with appropriate hardware and/or software interfaces between them. One or more of these elements may be implemented on a processor shared with other functional components of a Node B, for example. Alternatively, several of the functional elements of scheduling subsystem described above may be provided through the use of dedicated hardware, as well as hardware capable of executing software in association with appropriate software or firmware. Furthermore, the term "processor" or "controller" does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Those skilled in the art will appreciate the cost, performance, and maintenance tradeoffs inherent in these design choices.

Upon careful consideration of the preceding descriptions of sub-carrier allocation based on interference measurements or channel quality metrics, those skilled in the art will appreciate that these two approaches, although related, may require different measurements and will yield different results. Those skilled in the art will recognize the advantages and disadvantages of each approach, several of which have been identified above. Nonetheless, if sub-channel interference levels and sub-channel quality metric values are viewed as specific examples of channel measurement parameters, then the distinct embodiments described above may be viewed as specific embodiments of a more general approach. Accordingly, the various methods described herein comprise examples of a method for scheduling sub-carriers in an Orthogonal Frequency Division Multiplexing system, the method comprising: for each of two or more threshold levels for a channel measurement parameter, identifying one or more sub-carrier groups composed of contiguous sub-carriers corresponding to sub-channels having channel measurement parameter values superior to the threshold level; calculating an estimated data throughput for each of the identified sub-carrier groups in view of a selected mobile terminal; and allocating at least one of the identified sub-carrier groups to the selected mobile terminal according to the estimated data throughputs. Similarly, interference determination module 1020 and SINR determination module 1030 may be replaced with or augmented by a channel measurement module that determines the appropriate channel measurement parameter values for a scheduling subsystem configured to carry out one or more of the above-described methods.

With these and other variations and extensions in mind, those skilled in the art will appreciate that the foregoing description and the accompanying drawings represent non-limiting examples of the methods and apparatus taught herein for scheduling sub-carriers in an Orthogonal Frequency Division Multiplexing system, whether that system employs OFDMA, SC-FDMA, or both. As such, the inventive apparatus and techniques taught herein are not limited by the foregoing description and accompanying drawings. Instead, the present invention is limited only by the following claims and their legal equivalents.

What is claimed is:

1. A method of scheduling sub-carriers, implemented in a scheduling node of an Orthogonal Frequency Division Multiplexing (OFDM) communication system, the method comprising:

for each of two or more threshold interference levels, identifying one or more sub-carrier groups composed of contiguous sub-carriers corresponding to sub-channels having interference levels below the respective threshold interference level;

calculating an estimated data throughput for each of the identified sub-carrier groups in view of a selected mobile terminal; and allocating at least one of the identified sub-carrier groups to the selected mobile terminal according to the estimated data throughputs.

2. The method of claim 1, further comprising determining the two or more threshold interference levels based on a plurality of measured sub-channel interference levels.

3. The method of claim 1, further comprising generating a signaling message for the selected mobile terminal, the signaling message comprising a first parameter identifying a sub-carrier in a first one of the at least one allocated sub-carrier groups and a second parameter indicating the number of sub-carriers in the first one of the at least one allocated sub-carrier groups.

4. The method of claim 1, wherein the sub-carriers are organized into resource blocks comprising two or more contiguous sub-carriers, and wherein identifying one or more sub-carrier groups composed of contiguous sub-carriers corresponding to sub-channels having interference levels below the respective threshold interference level comprises identifying one or more sub-carrier groups composed of contiguous resource blocks, wherein each of the contiguous resource blocks is composed of sub-carriers corresponding to sub-channels having interference levels below the respective threshold interference level.

5. The method of claim 4, further comprising generating a signaling message for the selected mobile terminal, the signaling message comprising a first parameter identifying a resource block in a first one of the at least one allocated sub-carrier groups and a second parameter indicating the number of resource blocks in the first one of the at least one allocated sub-carrier groups.

6. The method of claim 1, wherein calculating an estimated data throughput comprises selecting one or more modulation formats and coding schemes based on the interference levels for the identified sub-carrier group and calculating the estimated data throughput as a function of the selected modulation formats and coding schemes.

7. The method of claim 1, wherein allocating at least one of the identified sub-carrier groups to the selected mobile terminal according to the estimated data throughputs comprises allocating an identified sub-carrier group having the highest estimated data throughput to the selected mobile terminal.

8. The method of claim 1, wherein allocating at least one of the identified sub-carrier groups to the selected mobile terminal according to the estimated data throughputs comprises selecting two or more of the identified sub-carrier groups having an aggregate estimated data throughput equal to or exceeding a data throughput target for the selected mobile terminal.

9. The method of claim 8, further comprising determining the data throughput target based on a buffered-data quantity corresponding to the selected mobile terminal.

10. A scheduling subsystem for scheduling sub-carriers in an Orthogonal Frequency Division Multiplexing (OFDM) communication system, comprising:
an interference determination module configured to determine one or more sub-channel interference levels; and
an allocation processor configured to control the interference determination module and to:
for each of two or more threshold interference levels, identify one or more sub-carrier groups composed of contiguous sub-carriers corresponding to sub-channels having interference levels below the respective threshold interference level;
calculate an estimated data throughput for each of the identified sub-carrier groups in view of a selected mobile terminal; and
allocate at least one of the identified sub-carrier groups to the selected mobile terminal according to the estimated data throughputs.

11. The scheduling subsystem of claim 10, wherein the allocation processor is further configured to determine the two or more threshold interference levels based on the sub-channel interference levels.

12. The scheduling subsystem of claim 10, further comprising a signaling block configured to generate a signaling message for the selected mobile terminal, the signaling message comprising a first parameter identifying a sub-carrier in a first one of the at least one allocated sub-carrier groups and a second parameter indicating the number of sub-carriers in the first one of the at least one allocated sub-carrier groups.

13. The scheduling subsystem of claim 10, wherein the sub-carriers are organized into resource blocks comprising two or more contiguous sub-carriers, and wherein the allocation processor is configured to identify one or more sub-carrier groups by identifying sub-carrier groups composed of contiguous resource blocks, wherein each of the contiguous resource blocks is composed of sub-carriers corresponding to sub-channels having interference levels below the respective threshold interference level.

14. The scheduling subsystem of claim 13, further comprising a signaling block configured to generate a signaling message for the selected mobile terminal, the signaling message comprising a first parameter identifying a resource block in a first one of the at least one allocated sub-carrier groups and a second parameter indicating the number of resource blocks in the first one of the at least one allocated sub-carrier groups.

15. The scheduling subsystem of claim 10, wherein the allocation processor is configured to calculate estimated data throughput by selecting one or more modulation formats and coding schemes for the identified sub-carrier group and calculating the estimated data throughput as a function of the selected modulation formats and coding schemes.

16. The scheduling subsystem of claim 10, wherein the allocation processor is configured to allocate an identified sub-carrier group having the highest estimated data throughput to the selected mobile terminal.

17. The scheduling subsystem of claim 10, wherein the allocation processor is configured to allocate two or more of the identified sub-carrier groups having an aggregate estimated data throughput equal to or exceeding a data throughput target for the selected mobile terminal.

18. The scheduling subsystem of claim 17, wherein the allocation processor is further configured to determine the data throughput target based on a buffered-data quantity corresponding to the selected mobile terminal.

19. A method of scheduling sub-carriers, implemented in a scheduling node of an Orthogonal Frequency Division Multiplexing (OFDM) system, the method comprising:
determining a channel quality metric value for each of a plurality of sub-channels, in view of sub-channel gains for a selected mobile terminal;
for each of two or more threshold levels for the channel quality metric, identifying one or more sub-carrier groups composed of contiguous sub-carriers corresponding to sub-channels having channel quality metric values superior to the respective threshold level;
calculating an estimated data throughput for each of the identified sub-carrier groups; and
allocating at least one of the identified sub-carrier groups to the selected mobile terminal according to the estimated data throughputs.

20. The method of claim 19, wherein determining a channel quality metric value for each of a plurality of sub-channels comprises estimating a signal-to-interference-plus-noise (SINR) ratio corresponding to the selected mobile terminal for each of the plurality of sub-channels.

21. The method of claim 20, wherein estimating a SINR ratio corresponding to the selected mobile terminal for each of the plurality of sub-channels comprises estimating the SINR ratios using one or more sounding reference signals.

22. The method of claim 20, further comprising determining the two or more threshold levels for the channel quality metric based on the estimated SINR ratios.

23. The method of claim 19, further comprising generating a signaling message for the selected mobile terminal, the signaling message comprising a first parameter identifying a sub-carrier in a first one of the at least one allocated sub-carrier groups and a second parameter indicating the number of sub-carriers in the first one of the at least one allocated sub-carrier groups.

24. The method of claim 19, wherein the sub-carriers are organized into resource blocks comprising two or more contiguous sub-carriers, and wherein identifying one or more sub-carrier groups composed of contiguous sub-carriers corresponding to sub-channels having channel quality metric values superior to the respective threshold level comprises identifying one or more sub-carrier groups composed of contiguous resource blocks, wherein each of the contiguous resource blocks is composed of sub-carriers corresponding to sub-channels having channel quality metric values superior to the respective threshold level.

25. The method of claim 24, further comprising generating a signaling message for the selected mobile terminal, the signaling message comprising a first parameter identifying a resource block in a first one of the at least one allocated sub-carrier groups and a second parameter indicating the number of resource blocks in the first one of the at least one allocated sub-carrier groups.

26. The method of claim 19, wherein calculating an estimated data throughput comprises selecting one or more modulation formats and coding schemes for the identified sub-carrier group based on the channel quality metric values and calculating the estimated data throughput as a function of the selected modulation formats and coding schemes.

27. The method of claim 19, wherein allocating at least one of the identified sub-carrier groups to the selected mobile terminal according to the estimated data throughputs comprises allocating an identified sub-carrier group having the highest estimated data throughput to the selected mobile terminal.

28. The method of claim 19, wherein allocating at least one of the identified sub-carrier groups to the selected mobile terminal according to the estimated data throughputs comprises selecting two or more of the identified sub-carrier groups having an aggregate estimated data throughput equal to or exceeding a data throughput target for the selected mobile terminal.

29. The method of claim 28, further comprising determining the data throughput target based on a buffered-data quantity corresponding to the selected mobile terminal.

30. A scheduling subsystem for scheduling sub-carriers in an Orthogonal Frequency Division Multiplexing (OFDM) communication system, comprising:
a channel quality determination module configured to determine a channel quality metric value for each of a plurality of sub-channels, in view of a selected mobile terminal; and
an allocation processor configured to control the channel quality determination module and to;
for each of two or more threshold levels, identify one or more sub-carrier groups composed of contiguous sub-carriers corresponding to sub-channels having channel quality metric values superior to the respective threshold level;
calculate an estimated data throughput for each of the identified sub-carrier groups; and
allocate at least one of the identified sub-carrier groups to the selected mobile terminal according to the estimated data throughputs.

31. The scheduling subsystem of claim 30, wherein the channel quality determination module is configured to determine channel quality metric values comprising signal-to-interference-plus-noise (SINR) ratios.

32. The scheduling subsystem of claim 31, wherein the channel quality determination module is configured to estimate the SINR ratios using one or more sounding reference signals.

33. The scheduling subsystem of claim 30, wherein the allocation processor is further configured to determine the two or more threshold levels based on the channel quality metric values.

34. The scheduling subsystem of claim 30, further comprising a signaling block configured to generate a signaling message for the selected mobile terminal, the signaling message comprising a first parameter identifying a sub-carrier in a first one of the at least one allocated sub-carrier groups and a second parameter indicating the number of sub-carriers in the first one of the at least one allocated sub-carrier groups.

35. The scheduling subsystem of claim 30, wherein the sub-carriers are organized into resource blocks comprising two or more contiguous sub-carriers, and wherein the allocation processor is configured to identify one or more sub-carrier groups by identifying sub-carrier groups composed of contiguous resource blocks, wherein each of the contiguous resource blocks is composed of sub-carriers corresponding to sub-channels having interference levels below the respective threshold interference level.

36. The scheduling subsystem of claim 35, further comprising a signaling block configured to generate a signaling message for the selected mobile terminal, the signaling message comprising a first parameter identifying a resource block in a first one of the at least one allocated sub-carrier groups and a second parameter indicating the number of resource blocks in the first one of the at least one allocated sub-carrier groups.

37. The scheduling subsystem of claim 30, wherein the allocation processor is configured to calculate estimated data throughput by selecting one or more modulation formats and coding schemes for the identified sub-carrier group and calculating the estimated data throughput as a function of the selected modulation formats and coding schemes.

38. The scheduling subsystem of claim 30, wherein the allocation processor is configured to allocate an identified sub-carrier group having the highest estimated data throughput to the selected mobile terminal.

39. The scheduling subsystem of claim 30, wherein the allocation processor is configured to allocate two or more of the identified sub-carrier groups having an aggregate estimated data throughput equal to or exceeding a data throughput target for the selected mobile terminal.

40. The scheduling subsystem of claim 39, wherein the allocation processor is further configured to determine the data throughput target based on a buffered-data quantity corresponding to the selected mobile terminal.

* * * * *

UNITED STATES PATENT AND TRADEMARK OFFICE
CERTIFICATE OF CORRECTION

PATENT NO.         : 7,933,350 B2                                    Page 1 of 1
APPLICATION NO.    : 11/928510
DATED              : April 26, 2011
INVENTOR(S)        : Liu et al.

It is certified that error appears in the above-identified patent and that said Letters Patent is hereby corrected as shown below:

In Column 18, Lines 2-3, in Claim 13, delete "more-sub-carrier" and insert -- more sub-carrier --, therefor.

Signed and Sealed this
Thirteenth Day of September, 2011

David J. Kappos
*Director of the United States Patent and Trademark Office*